(12) United States Patent
Mohaisen et al.

(10) Patent No.: US 11,595,398 B1
(45) Date of Patent: *Feb. 28, 2023

(54) ACCESS CONTROL FOR NAMED DOMAIN NETWORKING

(71) Applicant: VERISIGN, INC., Reston, VA (US)

(72) Inventors: Abedelaziz Mohaisen, Williamsville, NY (US); Maliheh Shirvanian, Birmingham, AL (US); G. Craig Murray, Bethesda, MD (US)

(73) Assignee: VeriSign, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,144

(22) Filed: Jan. 4, 2021

Related U.S. Application Data

(63) Continuation of application No. 14/868,594, filed on Sep. 29, 2015, now Pat. No. 10,887,314.

(51) Int. Cl.
| | |
|---|---|
| *H04L 9/40* | (2022.01) |
| *H04L 47/80* | (2022.01) |
| *H04W 12/08* | (2021.01) |
| *H04L 9/32* | (2006.01) |
| *H04L 65/1101* | (2022.01) |
| *H04L 67/00* | (2022.01) |

(52) U.S. Cl.
CPC .......... *H04L 63/102* (2013.01); *H04L 9/3271* (2013.01); *H04L 47/808* (2013.01); *H04L 63/0428* (2013.01); *H04L 63/0464* (2013.01); *H04L 63/083* (2013.01); *H04L 63/0815* (2013.01); *H04L 63/0892* (2013.01); *H04L 63/1441* (2013.01); *H04W 12/08* (2013.01); *H04L 65/1101* (2022.05); *H04L 67/00* (2013.01)

(58) Field of Classification Search
CPC ............. H04L 63/1441; H04L 63/0892; H04L 63/0815; H04L 67/10
See application file for complete search history.

(56) References Cited

U.S. PATENT DOCUMENTS 7,475,146 B2 * 1/2009 Bazot .................. H04L 63/0815
709/227
7,546,276 B2 * 6/2009 Randle .................... G06F 21/31
705/65

(Continued)

*Primary Examiner* — Barbara B Anyan
(74) *Attorney, Agent, or Firm* — Baker Botts L.L.P.; Michael A. Sartori

(57) ABSTRACT

The disclosure is directed to providing content access control in information centric networking (ICN) networks. Methods and systems include hardware and/or software that perform operations for sending to a content provider of an ICN network an access request for content in response to receiving a first content request from a client. The operations also include receiving from the content provider access control information for the content. The operations further include sending to the client a challenge. Additionally, the operations include receiving from the client an authorization of the content provider that includes information obtained by the client from the content provider based on the challenge. Furthermore, the operations include verifying the authorization received from the client using the access control information received from the content provider. Moreover, the operations include sending to the client the content.

21 Claims, 3 Drawing Sheets

(56) References Cited

U.S. PATENT DOCUMENTS

| | | | |
|---|---|---|---|
| 7,624,181 B2 * | 11/2009 | Townsley | H04L 63/0892 709/225 |
| 8,707,428 B2 * | 4/2014 | Iyer | H04L 63/1441 726/22 |
| 2003/0005280 A1 | 1/2003 | Bobde et al. | |
| 2004/0117493 A1 | 6/2004 | Bazot et al. | |
| 2006/0095422 A1 | 5/2006 | Kikuchi | |
| 2006/0136724 A1 | 6/2006 | Takeshima et al. | |
| 2011/0058675 A1 * | 3/2011 | Brueck | H04N 21/8355 709/229 |
| 2013/0046664 A1 * | 2/2013 | Kazerani | H04L 67/10 705/34 |
| 2013/0179680 A1 | 7/2013 | Peterka et al. | |
| 2014/0143543 A1 * | 5/2014 | Aikas | G06F 16/252 713/168 |
| 2014/0189808 A1 | 7/2014 | Mahaffey et al. | |
| 2014/0258377 A1 | 9/2014 | Matsumura | |
| 2015/0156280 A1 | 6/2015 | Vaswani et al. | |
| 2015/0278866 A1 | 10/2015 | Levi | |

\* cited by examiner

ACCESS CONTROL FOR NAMED DOMAIN NETWORKING

CROSS-REFERENCE TO RELATED APPLICATIONS

This application is a continuation of the co-pending U.S. Patent Application titled, "ACCESS CONTROL FOR NAMED DOMAIN NETWORKING," filed on Sep. 29, 2015 and having Ser. No. 14/868,594. The subject matter of this related application is hereby incorporated herein by reference

BACKGROUND

Information centric networking (ICN) architectures, such as named data networking (NDN) and content centric networking (CCN), use pervasive caching of information. In ICN, content does not reside in a single location. Instead, the content is cached across the network. For example, edge routers in an ICN network can each act as a content store, and the edge routers are connected to users and origin servers. In ICN, network names describe the content itself, rather than the location of the content. When a user wants to access the named content, it is retrieved from the closest available content store, rather than from a singular point of origin. This reduces network congestion and latency. However, the general architecture of conventional ICN protocols, such as NDN and CCN, do not provide strong content access control. That is, because content in an ICN network is distributed in various content stores, content producers and origin servers do not have centralized control over who can accesses what content and when.

SUMMARY

In accordance with aspects of the present disclosure, methods and systems are provided for controlling access to content in an ICN network. The methods and systems perform operations for sending to a content provider of an ICN network an access request for content in response to receiving a first content request from a client. The operations also include receiving from the content provider access control information for the content. The operations further include sending a challenge to the client. Additionally, the operations include receiving from the client an authorization of the content provider that includes information obtained by the client from the content provider based on the challenge. Furthermore, the operations include verifying the authorization received from the client using the access control information received from the content provider. Moreover, the operations include sending the content to the client.

DRAWINGS

The present invention will become more fully understood from the detailed description and the accompanying drawings, wherein.

DETAILED DESCRIPTION

The present disclosure is generally directed to content delivery in distributed information networks. More specifically, systems, methods, and computer-readable storage devices in accordance with aspects of the present disclosure provide content access control in ICN networks. It is understood that such ICN networks may be implemented using protocols such as NDN, CCN, and/or other information centric networking protocols not yet developed. In embodiments consistent with the present disclosure, a server of the ICN network (e.g. an NDN router) receives an anonymous content request (e.g., an "interest message") for access-controlled content from a client (e.g., a computing device of a content consumer). In response, the server issues a challenge to the client. Triggered by the challenge, the client can then send an access request to an access controller of a content provider (e.g., a content store or repository) with information from the challenge, client credentials (e.g., a user ID, and a cryptographic signature), and an identifier of the content (e.g., the content name). After verifying that the client is authorized to access the requested content, the access controller may provide an authorization (e.g., a cryptographically signed response to the challenge) as proof of access privilege, and may send the authorization in a response to the client. The client forwards the access control provider's authorization to the server. The server verifies the authorization using information the server obtained from the content provider (e.g., a public key) and, if the authorization is verified, sends the requested content to the client. Thus, in accordance with aspects of the present disclosure, the server can selectively provide content to the client based on access controls set by the content provider and managed by the access controller, while the client can remain anonymous to the server.

The forgoing operations enable a server of an ICN network to provide robust content access control while maintaining the anonymity of clients of the server. Additionally, by storing and distributing the content locally in the server, embodiments disclosed herein reduce data traffic that would otherwise be required to repeatedly transmit the content from the content provider via an ICN network.

Figure 1:
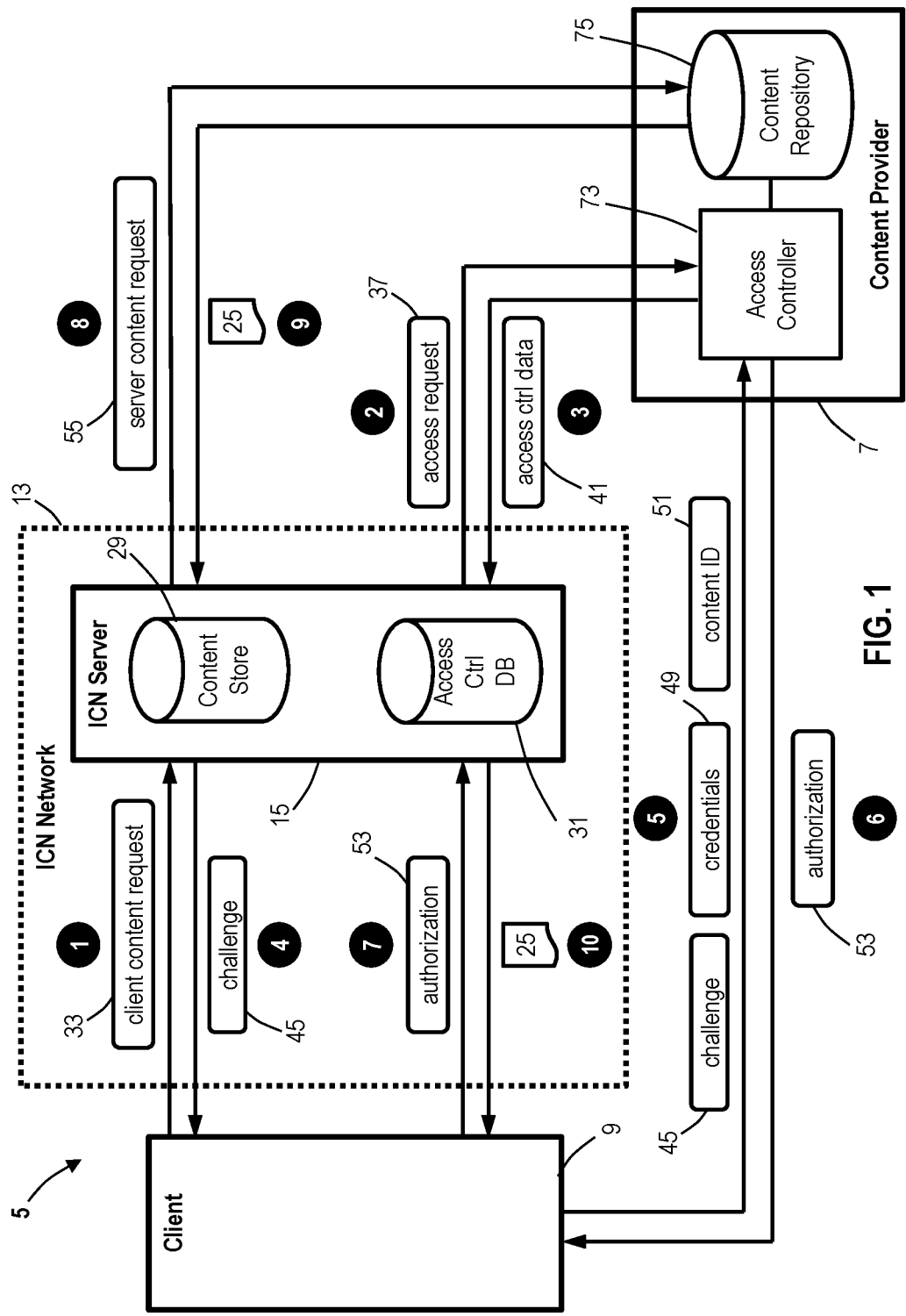
FIG. 1 illustrates a block diagram of an example of an environment for implementing systems and processes in accordance with aspects of the present disclosure.

FIG. 1 illustrates a block diagram of an example of an environment 5 for implementing systems and methods in accordance with aspects of the present disclosure. The environment 5 includes a content provider 7, client device 9, and ICN network 13. The content provider 7 can be any entity that generates, manages, and/or provides a repository 75 of computer-readable and/or computer-executable content 25. The content 25 can be one or more files including, for example, documents, images, videos, computer programs, etc. Client 9 can be a computing device of a content consumer (e.g., a desktop computer or a mobile computing device) that requests content 25 provided by the content provider 7 to the ICN network 13. For example, the content provider 7 can be a healthcare data repository, the content 25 can be personally-identifiable medical data of an individual, and the client 9 can be a patient management system of a healthcare provider.

The content provider 7 can include an access controller 73 and a content repository 75. The access controller 73 can be a system, software, or a combination thereof that restricts access to content stored in the content repository 75 and selectively determines whether to grant access to the content therein. In embodiments, the access controller 73 stores access control policies (e.g., access control lists) that associate individual clients or groups of clients with individual content objects or groups of content objects that the clients are authorized to access. Content repository 75 securely stores and selectively serves content (e.g., content 25) under control of the access controller 73. While the access controller 73 and the content repository 75 are illustrated in FIG. 1 as being co-located in the content provider 7, it is understood that the access controller 73 and the content repository 75 can be provided by separate systems remote from one another and/or the content provider 7. Additionally, while the access controller 73 and the content repository 75 are illustrated in FIG. 1 as being outside the ICN network 13, it is also understood that the access controller 73 and the content repository 75 can be included in and/or components of the ICN network 13.

The ICN network 13 can be an information system that includes at least one ICN server 15 communicatively linked to the content provider 7 and the client 9 via the ICN network 13. The ICN server 15 can be, for example, an NDN router. In embodiments, the ICN server 15 can include a content store 29 that caches content (e.g., content 25) that obtained from one or more content providers (e.g., content provider 7). Additionally, the ICN server 15 can include an access control database 31 that stores access control data. The access control data can include, for example, access control policies, user privileges, and/or cryptographic keys obtained from the content provider 75. It is understood that the configuration of the ICN network 13 illustrated in FIG. 1 is simplified for the sake of example and that other configurations and relationships are within the scope of the present disclosure. For example, the ICN network 13 can include substantially more than one ICN node, such as ICN sever 15. For example, the ICN network 13 can include a number of such nodes in different network zones and/or geographical regions. Additionally or alternatively, the ICN nodes can be arranged hierarchically in additional layers or groupings within the ICN network 13. Additionally, the ICN network 13 may be composed of nodes using a singular protocol, such as NDN, CCN, and the like.

Still referring to FIG. 1, the environment 5 illustrates a functional flow of an example of a process by which the client 9 can obtain the content 25 via the ICN network 13 in accordance with aspects of the present disclosure. The functional flow is accompanied in FIG. 1 by the black circles, which are numbered (1)-(10) to aid in clarity. Initially, the client 9 lacks a copy of the desired content 25 and sends a client content request 33 (e.g., an NDN interest message) to the ICN network 13. The client content request 33 can include a name of the content 25. Additionally, the client content request 33 can include an access control tag that indicates whether the content 25 is access-controlled such that it requires authorization prior to being accessed by the client 9. In some embodiments, the client content request 33 is anonymous. For example, the client content request 33 can lack any information identifying the client. In other embodiments, the client content request 33 can include an anonymous identifier of the client 9, such as a one-time password token.

At (1) the ICN server 15 can receive the client content request 33 from the client 9. In some embodiments, based on the access control tag in the client content request 33, the ICN server 15 determines whether the client 9 must have authorization to access the content 25. In other embodiments, the access control database 31 stores policy information indicating that the client 9 must have authorization to access the content 25. For example, content 25 may be a confidential medical record of an individual. Thus, the access control tag associated with the name of the content 25 in the content request 33 can indicate that authorization is required to receive the content 25. In embodiments, the content provider 7 receives the client content request 33 and determines whether the content 25 is already stored in its local content store 29 or needs to be retrieved from the content repository 75. In cases where the content 25 is already stored in the local content store 29, the process illustrated in FIG. 1 can skip (8) and (9) as described below.

At (2), in response to receiving the client content request 33 and determining that access control is indicated by the content tag, the ICN server 15 sends an access request 37 to the content provider 7. In accordance with some embodiments of the present disclosure, the access request 37 does not identify the client 9 (or the user thereof). Rather, the client 9 is kept anonymous. Thus, the access request 37 can include information including the content name and exclude any information uniquely identifying the client 9. In embodiments, the access request 37 functions to request a key (e.g., a cryptographic public key) for the content 25 from the access controller 73. The access controller 73 can use a predetermined policy (e.g., an access control lookup table) to determine whether to approve the request.

At (3) the access controller 73 responds to the access request 37 by sending access control data 41 to the ICN server 15. In embodiments, the access control data 41 includes a cryptographic key (e.g., an encryption key) corresponding to the requested content 25 and information limiting how long the key is valid (e.g., a time-to-live value). In some embodiments, the cryptographic key can be used for more than one content object (e.g., content 25) from the content provider 7.

At (4) the ICN server 15 sends a challenge 45 to the client 9 in response to the client content request 33 received from the client 9. The challenge 45 can be sent before, after, or at the same time as the sending of the access request 37. In embodiments, the challenge 45 contains a problem (e.g., an encrypted value) that can only be solved (e.g., decrypted) by the access controller 73. For example, the challenge 45 may include a nonce known only to the ICN server 15 that has been encrypted using a key included in the access control data 41 provided to the ICN server 15 by the access controller 73 at (3). Thus, the client 9 must obtain the solution (e.g., the decrypted nonce) to the problem from the access controller 73 by sending the challenge 45 and credentials 49 to the controller 73 at (5). The credentials 49 may contain an identifier of the client 9 and a cryptographic signature. The credentials 49 may also contain a cryptographic key (e.g., a public key) which the access controller could use to encrypt the response to the client 9 (i.e., authorization 53). Thus in this example, at (5), the client 9 sends the challenge 45 received from the ICN server at (4) to the content provider 7, along with credentials 49 and a content identifier 51 that identifies the requested content 25. The challenge 45, the credentials 49, and the content identifier 51 can be sent in separate messages or combined into a single message. Based on the challenge 45 and/or the credentials 49, the content provider 7 determines whether to authorize the client to access the content 25 from the ICN server 15. For example, the access controller 73 can check the credentials 49 of the client 9 using a predefined access policy (e.g., whether the client 9 and/or the credentials 49 are present on an access control list) and verify whether the client 9 has access to the content 25 identified in the content identifier 51.

If the access controller 73 verifies that the client 9 is authorized to access to the content 25, then the access controller 73 solves the problem included in the challenge.

At (6), the access controller 73 returns the solution to the problem to the client 9 in authorization 53. In accordance with the embodiments disclosed herein, the authorization is anonymous with respect the client 9, in the same or similar manner to the client content request 33. Thus, the identity of the client 9 can be entirely withheld from the ICN network 13 and/or ICN server 15.

At (7) the client 9 sends the authorization 53 to the ICN server 15. Using the authorization 53 and the access control data 41, the ICN server 15 determines whether the content provider 7 has granted the client 9 access to the content 25. In accordance with aspects of the present disclosure, the authorization 53 presented to the ICN server 15 at (7) contains the solution to the problem sent to the client in the challenge 45 at (4). Because the solution could only have been generated by the access controller 73, the authorization 53 indicates to the ICN server 15 that access to content 25 is granted.

If the ICN server 15 already possesses an instance of the content 25 (e.g., in its cache in content store 29), then the ICN server 15 may skip (8) and (9) and at (10) provide the content 25 to the client 9 from its content store 29.

If, on the other hand, the ICN server 15 does not have a local copy of the content 25, then at (8) the ICN server 15 may transmit a server content request 55 to the content provider 7. At (9) the content provider 7 responds to the server content request 55 by sending the content 25 to the ICN server 15. The ICN server 15 can cache the content 25 in content store 29. At (10), the ICN server 15 provides the content to the client 9.

The process flow of (1) through (10) may iterate for subsequent client content requests 33 from client 9, or other clients. However, in such subsequent client content requests 33, (8) and (9) may be omitted depending on whether the requested content (e.g., content 25) is already held in the content store 29 and is valid (e.g., has an unexpired time-to-live).

Figure 2:
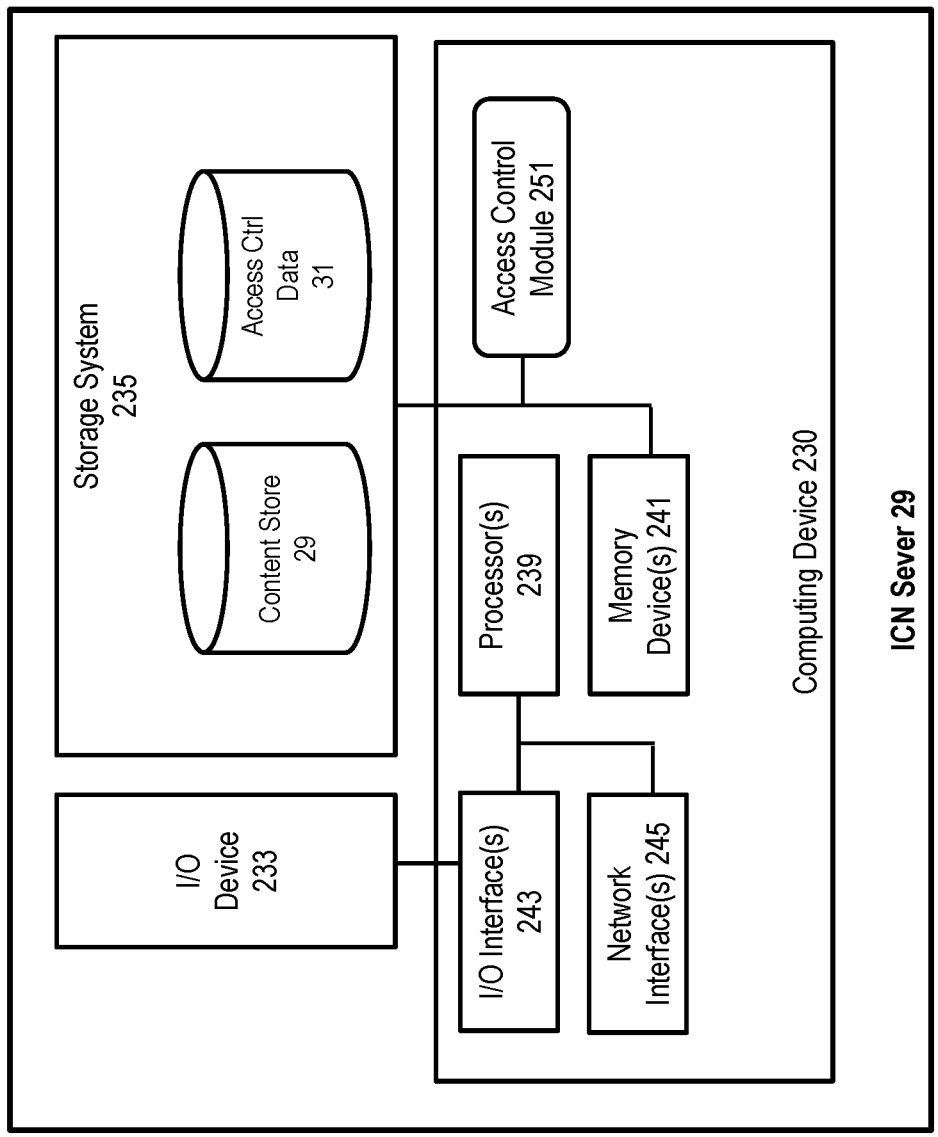
FIG. 2 illustrates a system block diagram of an example of an ICN server in accordance with aspects of the present disclosure.

FIG. 2 illustrates a system block diagram of an ICN server 15 in accordance with aspects of the present disclosure. The ICN server 15 can be the same or similar to the ICN server previously described. The ICN server 15 includes hardware and software that perform processes and functions described herein. In particular, the ICN server 15 includes a computing device 230, an input/output (I/O) device 233, and a storage system 235. The I/O device 233 can include any device that enables an individual (e.g., an end user and/or consumer) to interact with the ICN server 15 (e.g., a user interface) and/or any device that enables the computing device 230 to communicate with one or more other computing devices using any type of communications link. The I/O device 233 can include, for example, a touchscreen display, pointer device, keyboard, etc.

The storage system 235 can comprise a computer-readable, non-volatile hardware storage device that stores information and program instructions. For example, the storage system 235 can be one or more flash drives and/or hard disk drives. In accordance with aspects of the present disclosure, the storage system can include a content store 29 and an access control database 31, which can be the same or similar to that previously described herein.

In embodiments, the computing device 230 includes one or more processors 239 (e.g., microprocessor, microchip, or application-specific integrated circuit), one or more memory devices 241 (e.g., RAM and ROM), one or more I/O interfaces 243, and one or more network interfaces 244. The memory device 241 can include a local memory (e.g., a random access memory and a cache memory) employed during execution of program instructions. Additionally, the computing device 230 includes at least one communication channel (e.g., a data bus) by which it communicates with the I/O device 233, the storage system 235, and the device selector 137. The processor 239 executes computer program instructions (e.g., an operating system and/or application programs), which can be stored in the memory device 241 and/or storage system 135. Moreover, the processor 239 can execute computer program instructions of an access control module 251 for granting clients (e.g., client 9) access to particular content (e.g., content 25). In accordance with aspects of the present disclosure, the access control module 251 can communicate with the clients to receive content requests (e.g., client content request 33), determine whether the requested content is subject to access control, and communicate with content providers (e.g., content provider 7) to obtain access control data (e.g., access control data 41) and the requested content.

It is noted that in some embodiments the computing device 230 can comprise any general purpose computing article of manufacture capable of executing computer program instructions installed thereon (e.g., a personal computer, server, etc.). However, the computing device 230 is only representative of various possible equivalent-computing devices that can perform the processes described herein. To this extent, in embodiments, the functionality provided by the computing device 130 can be any combination of general and/or specific purpose hardware and/or computer program instructions. In each embodiment, the program instructions and hardware can be created using standard programming and engineering techniques, respectively.

Figure 3:
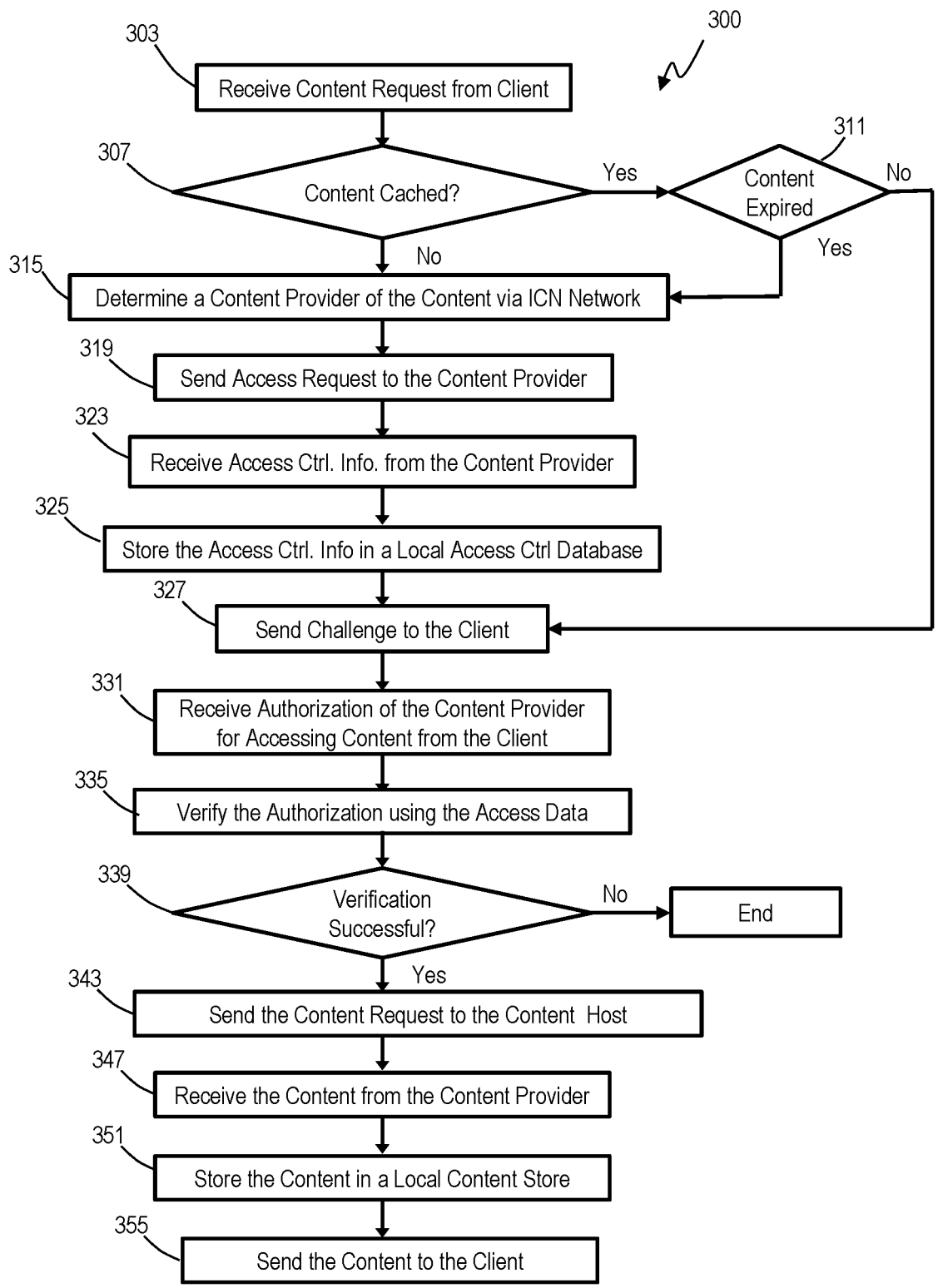
FIG. 3 illustrates a flow diagram of an example of a process in accordance with aspects of the present disclosure.

The flow diagram in FIG. 3 illustrates an example of the functionality and operation of a possible implementation of systems, devices, methods, and computer program products according to various embodiments of the present disclosure. Each block in the flow diagram of FIG. 3 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIG. 3. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIG. 3 illustrates a flow diagram of an example of a process 300 in accordance with aspects of the present disclosure. At 303, an ICN server (e.g., ICN server 15) of an ICN network (e.g., ICN network 13) receives a content request (e.g., client content request 33) from a client (e.g., client 9) requesting content (e.g. content 25) using a content name. At 307, the ICN server determines whether an instance of the requested content specified by the name in the content request received at 303 is stored in the cache of the ICN server (e.g., in content store 29).

If the ICN server determines that the content is stored in the cache (i.e., 307, "yes"), then at 311 the ICN server determines whether the content stored in the cache is expired (e.g., based on time-to-live parameter of the content). If it is determined at 311 that the content requested in 307 is not expired (i.e., 311, "no"), then at 327, a challenge is sent (e.g., challenge 45) to the client as detailed below.

If at 307 the second server determines that the content is not stored in the cache (i.e., 307, "no"), or if at 311 that the content requested in 303 is expired (i.e., 311, "yes"), then at 315 the server determines the name of the content provider via the ICN network. For example, the ICN server can determine the content provider by querying the ICN network, which forwards the query until it reaches a node containing the requested information and returns a result to the ICN server.

At 319 the ICN server sends an access request (e.g., access request 37) to the content provider identified at 315. At 323 the ICN server receives access control data (e.g., access control data 41) sent from an access controller (e.g., access controller 73) associated with the content provider in response to the access request sent at 319. At 325, the ICN server can store the access control data received at 323 in a local access control database (e.g., access control database 31).

At 327, the ICN server sends a challenge (e.g., challenge 45) to the client from which the content request was received in step 303. In accordance with aspects of the present disclosure, the challenge includes a problem only solvable by the content provider. The client sends the challenge to the content provider to obtain an authorization (e.g., authorization 53) to access the content requested at 303. At 331, if the challenge sent at 327 is verified by the content provider, the ICN server receives from the client an authorization (e.g., authorization 53) provided from to the content provider to the client. For example, the problem may be information (e.g., a nonce) encrypted by the ICN server using a public key of the content provider, such that it can only be decrypted by a private key of the content provider.

At 335, the ICN server verifies the authorization received from the client at 331 using the access control data received from the content provider at 323. For example, the challenge sent to the client at 327 could be compared to the solution returned by the client at 331. At 339 the ICN server determines whether the verification performed at 335 was successful. If the verification at 339 was not successful (i.e., "No"), the process ends and the client does not gain access to the requested content.

If the verification at 339 was successful (i.e., "Yes"), then the ICN server can send a server content request (e.g., server content request 55) to the content provider. If the content provider approves the content request of 343, then at 347 the ICN server receives the content from the content provider. At 351, the ICN sever can store the received content in a local content store (e.g., content store 29) from which the content can be subsequently distributed without the ICN server requesting the content from the content provider. At 355 the ICN sever sends the content to the client. As noted, if the ICN server already has the unexpired content stored in a local content store (e.g., as may be indicated at 311 "no"), then 343-351 may be skipped, and the unexpired content from the local store may be sent to the client at 355.

In accordance with aspects of the present disclosure, process 300 maintains the anonymity of the client with regard to the ICN network, which can protect users' (e.g. consumers or patients or the like) privacy, especially with regard to personally identifiable information (i.e., "PII"). Additionally, the process 300 provides an ICN network with robust content access control, which prevents unauthorized distribution of controlled content by nodes of the ICN network. Furthermore, by storing and distributing the content locally in the ICN server, the process 300 reduces data traffic that would otherwise be required to repeatedly transmit the content from the content provider.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 239), an application specific integrated circuit, a field programmable gate array or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a microprocessor, a plurality of microprocessors, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units (e.g., memory device 241 or storage system 235) and executed by the processor. The memory unit can be implemented within the processor or external to the processor (e.g., processor 239), in which case it can be communicatively coupled to the processor via various means as is known in the art.

If implemented in software, the functions may be stored on or transmitted over a computer-readable medium as one or more instructions or code. Computer-readable media includes non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one embodiment be plural or distributed, and resources described as multiple or distributed can in embodiments be combined. The scope of the present teachings is accordingly intended to be limited only by the following claims. Although the invention has been described with respect to specific embodiments, those skilled in the art will recognize that numerous modifications are possible. For instance, the proxy servers can have additional functionalities not mentioned herein. In addition, embodiments of the present disclosure can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

What is claimed is:

1. A computer-implemented method comprising:
    sending a content request for a first content item;
    receiving a challenge from a first server;
    providing, to a content provider, the challenge;
    receiving from the content provider, an authorization, wherein:
        the authorization is a response to the challenge, and
        the content provider provides the authorization to a client device in response to the client device providing the challenge to the content provider;
    providing, to the first server, the authorization; and
    receiving, from the first server, the first content item.

2. The computer-implemented method of claim 1, wherein the first content item is cached in a content store of the first server.

3. The computer-implemented method of claim 1, wherein when the first server determines that the first content item is not cached in a content store of the first server, the first content item is retrievable by the first server from the content provider.

4. The computer-implemented method of claim 1, wherein the first server receives, from the content provider, access control information for the first content item.

5. The computer-implemented method of claim 1, wherein the first content item is received upon the first server verifying the authorization.

6. The computer-implemented method of claim 1, further comprising:
    providing an authorization credential to the content provider, wherein the authorization credential includes at least one of: a client identifier, a cryptographic signature, or a content identifier for the first content item.

7. The computer-implemented method of claim 1, wherein the content request does not identify the client.

8. The computer-implemented method of claim 1, wherein the challenge includes a problem solvable only by the content provider.

9. The computer-implemented method of claim 1,
    wherein the content provider is configured to provide access control data,
    wherein the access control data comprises a key corresponding to encrypted information of the authorization.

10. The computer-implemented method of claim 1, wherein the challenge comprises a nonce encrypted with a key of the content provider.

11. The computer-implemented method of claim 1, wherein the first server comprises a named data networking (NDN) router.

12. The computer-implemented method of claim 1, wherein the content provider is configured to respond to the challenge based on verification of an authorization credential of the client.

13. A system comprising:
    a memory storing instructions; and
    a processor coupled to the memory that executes the instructions by performing the steps of:
        sending a content request for a first content item;
        receiving a challenge from a first server;
        providing, to a content provider, the challenge;
        receiving, from the content provider, an authorization, wherein:
            the authorization is a response to the challenge, and
            the content provider provides the authorization to a client device in response to the client device providing the challenge to the content provider;
        providing, to the first server, the authorization; and
        receiving, from the first server, the first content item.

14. The system of claim 13, wherein the first content item is cached in a content store of the first server.

15. The system of claim 13, wherein when the first server determines that the first content item is not cached in a content store of the first server, the first content item is retrievable by the first server from the content provider.

16. The system of claim 13, further comprising:
    providing an authorization credential to the content provider, wherein the authorization credential includes at least one of: a client identifier, a cryptographic signature, or a content identifier for the first content item.

17. The system of claim 13, wherein the content request does not identify the client.

18. The system of claim 13, wherein the challenge includes a problem solvable only by the content provider.

19. The system of claim 13,
    wherein the content provider is configured to provide access control data,
    wherein the access control data comprises a key corresponding to encrypted information of the authorization.

20. The system of claim 13, wherein the challenge comprises a nonce encrypted with a key of the content provider.

21. One or more non-transitory computer-readable media storing instructions that, when executed by one or more processors, cause the one or more processors to perform the steps of:
    sending a content request for a first content item;
    receiving a challenge from a first server;
    providing, to a content provider, the challenge;
    receiving, from the content provider, an authorization, wherein:
        the authorization is a response to the challenge, and
        the content provider provides the authorization to a client device in response to the client device providing the challenge to the content provider;
    providing, to the first server, the authorization; and
    receiving, from the first server, the first content item.

* * * * *